July 4, 1961    L. A. VOSS    2,990,967
TRAILER AND PALLET LOADING DEVICE
Filed April 8, 1959    3 Sheets-Sheet 1

LESLIE A. VOSS
INVENTOR.

ATTORNEY

July 4, 1961

L. A. VOSS 2,990,967

TRAILER AND PALLET LOADING DEVICE

Filed April 8, 1959

LESLIE A. VOSS
INVENTOR.

BY *Loyal J. Miller*

ATTORNEY

July 4, 1961 L. A. VOSS 2,990,967
TRAILER AND PALLET LOADING DEVICE
Filed April 8, 1959 3 Sheets-Sheet 3

LESLIE A. VOSS
INVENTOR.

BY *Loyd J. Miller*
ATTORNEY

United States Patent Office 2,990,967
Patented July 4, 1961

2,990,967
TRAILER AND PALLET LOADING DEVICE
Leslie A. Voss, 3212 N. Harvey Parkway,
Oklahoma City, Okla.
Filed Apr. 8, 1959, Ser. No. 805,004
1 Claim. (Cl. 214—515)

The present invention relates to trailers and more particularly to a closed type semi-trailer.

Many of the conventional closed type semi-trailers presently used are of relatively long length and are preferably so in order that more material or articles may be transported therein. Since the trailer widths are limited by law, the overall configuration of the trailer is of substantially a relatively narrow rectangular shape. Most of these trailers have the access opening or doors positioned at the rearward end of the trailer thus necessitating loading and unloading the trailer from this rearward end. It is conventional practice, at the present time, to position the rearward end of the trailer adjacent a loading dock having a horizontal supporting surface lying substantially in the same plane as the floor of the trailer. Since considerable time is involved in removing the articles or material out of the trailer and reloading the trailer, the truck-tractor is disconnected from the semi-trailer while this loading or unloading precedure is carried on; this results in tying up or inactivating the semi-trailer for various lengths of time as well as rendering a portion of the loading dock unavailable to other trailers in the area equal to the width of the semi-trailer and possibly a greater area which may be occupied by articles removed from or to be placed in the trailer.

It is, therefore, the principal object of the instant invention to provide a means for quickly unloading and reloading a semi-trailer.

Another object is to provide a mobile carriage movable into and out of a trailer which will support the articles to be loaded within the trailer in a mobile manner thereby completely loading or unloading the trailer by simply moving the loaded carriage into or out of the trailer in one operation.

Another object is to provide a trailer having one or more side panels hingedly connected along its uppermost edge for exposing or opening a lateral side portion of the trailer covered by such panel or panels to facilitate quickly removing or placing articles within the trailer.

Another object is to provide a mobile carriage or pallet which may be moved into or out of a trailer and wherein the trailer floor is provided with guide rails for supporting the carriage.

Another object is to provide a mobile carriage means adapted to be received by the flooring supports of a trailer and which may be moved into and out of a trailer and across a loading dock supporting surface without disturbing the articles placed upon the carriage.

A further object is to provide a trailer loading and unloading means which will reduce the amount or area of dock loading space required by appreciably reducing the time required for such loading and unloading operations.

Still another object is to provide a trailer carriage or pallet loading and unloading device which may be easily adapted for use with existing trailers.

The present invention accomplishes these and other objects by providing a rectangular closed semi-trailer of substantially conventional construction and having parallel guide rails horizontally supported by the trailer floor supports. At least one side panel, forming a lateral side of the trailer, is hingedly connected along its uppermost edge to the top panel structure of the trailer for vertical swinging movement of the side panel thus exposing and covering the interior of the trailer. Substantially horizontally disposed carriage means, supported by wheels journaled on horizontal axles connected with opposing side edges of the carriage, is cooperatingly received by the guide rails carried by the trailer. The overall dimensions of the carriage being slightly less than the inside dimensions of the trailer area which receives the carriage means.

Other objects will be apparent from the following description when taken in conjunction with the accompanying three sheets of drawings, wherein.

Like characters of reference designate like parts in those figures of the drawings in which they occur.

In the drawings.

Figure 1:
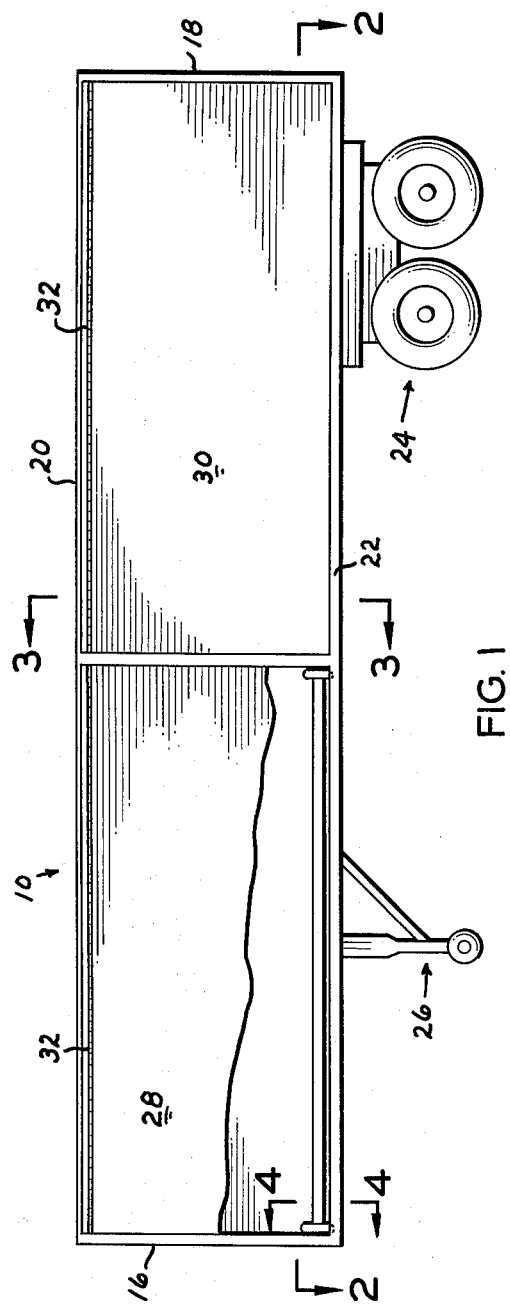
FIGURE 1 is a side elevational view of a semi-trailer having a portion of one side panel broken away to illustrate the relative position of the carriage means therein.
Figure 2:
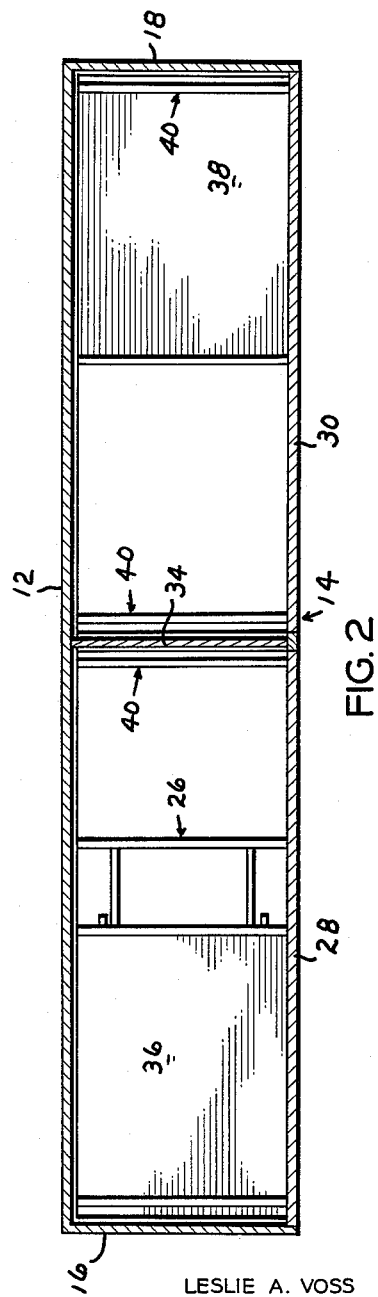
FIGURE 2 is a horizontal cross-sectional view taken substantially along line 2—2 of FIG. 1.

The reference numeral 10 indicates a semi-trailer, as a whole, which is rectangular in general configuration and includes opposing sides 12 and 14, ends 16 and 18, each integrally joined at their respective meeting edges to a top 20 and the trailer bottom or floor support members 22. Rearwardly the trailer 10 is supported in a mobile manner by a conventional wheel and support means 24. The forward end of the trailer is adapted to be connected to a truck-tractor, not shown, in a conventional manner. When the trailer is not in mobile operation, the forward end portion is supported by a wheel and strut means 26 which is conventional.

On relatively long semi-trailers, for example, those which are approximately forty-four feet in length, the side panel 14 is divided medially its ends to form a front panel 28 and a rear panel 30. Each of the panels 28 and 30 are hingedly connected by hinge means 32 to the top panel 20 for individual vertical swinging movement of these panels and opening and closing the forward and rearward lateral side portions of the trailer. Similarly the interior of the trailer may be divided by a transverse partition 34, if desired. In the example shown by the drawings, the trailer is not floored except at its forward and rearward end portions, as is indicated at 36 and 38, for the purposes of preventing mud and dirt being thrown upwardly into the trailer from the rear wheels of the truck-tractor, not shown, and from the trailer wheels 24, respectively. Obviously, where the trailer is to be equipped with refrigerating means for transporting perishable goods the trailer must be floored.

Figure 5:
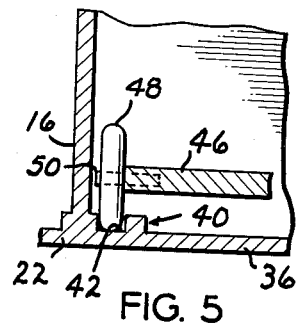
FIGURE 5 is a fragmentary vertical cross-sectional view illustrating one wheel of the carriage means and its supporting guide rail.

A guide rail member 40, integrally connected to the bottom edge portions of the side panels forming the floor supporting members 22, extends transversely of the trailer adjacent the inner surface of the forward and rearward end panels and on opposing sides of the partition 34. Each of the guide rails 40 is formed with a wheel receiving groove 42 in its upper surface which is substantially rectangular when viewed in cross section (FIG. 5). The rectangular configuration of the groove 42 is not important in that its cross sectional shape may be arcuate or of U-shape. It is important that the groove 42 extend the entire length of each respective guide rail for the purposes which will presently be apparent.

Figure 4:
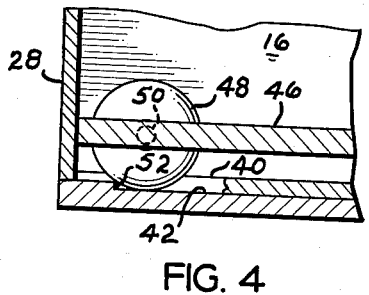
FIGURE 4 is a fragmentary vertical cross-sectional view taken substantially along line 4—4 of FIG. 1.

It will be noted that the floor or floor position and consequently the horizontal plane within which the guide rails 40 lie is a horizontal plane common to the upper-surface 44 of a conventional loading dock 46. A carriage 45 comprising a substantially rectangular platform 46 supported horizontally by a plurality, in the example shown, four wheels 48, journaled on horizontal axles 50, secured to opposing side edges of the platform 46 is movable in a mobile manner across the dock surface 44 and into the trailer 10. The wheels 48 are arranged on the sides of the platform 46 in alignment with the respective guide rail grooves 42. The overall dimensions of the carriage 45 is slightly less than the inside dimensions of the trailer portion in which the carriage is to be placed so that the carriage may be freely rolled into and out of the trailer. It will be noted from an examination of FIG. 4 that the bottom of the guide rail groove 42 is disposed slightly below the level of the adjacent floor supporting member in order to form a wheel stop 52 to prevent a tendency of the carriage to roll out of the trailer by gravity if the floor of the trailer is inclined downwardly with respect to the horizontal plane of the dock surface when either of the panels 28 or 30 is opened.

Figure 6:
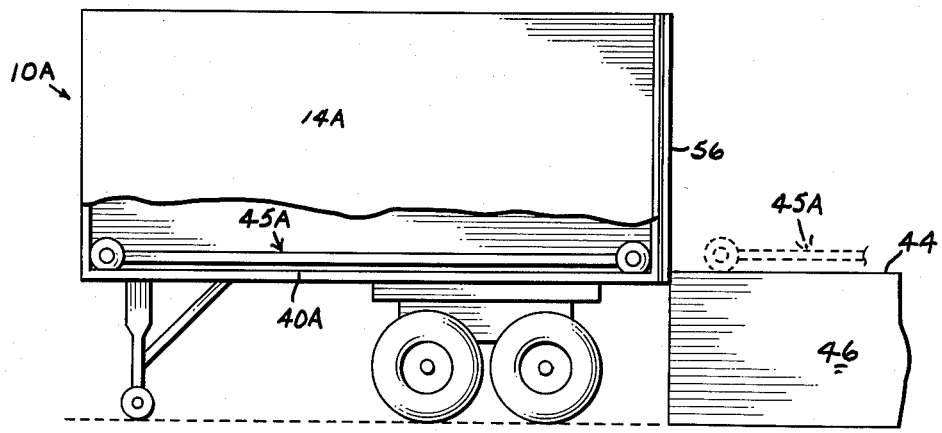
FIGURE 6 is a side elevational view of an alternate form of the trailer and its relative position with respect to a fragment of a loading dock.
Figure 8:
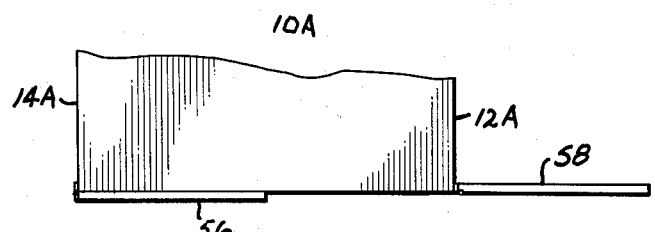
Figure 7:
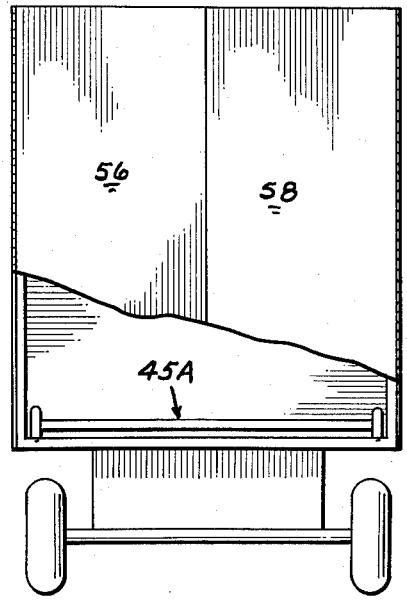
FIGURE 7 is a rear end elevational view of the trailer illustrated in FIG. 6 wherein a portion of the rearwardly opening doors are broken away for clarity; and, FIGURE 8 is a fragmentary top plan view illustrating the hinge connection of the rearwardly opening doors of the trailer shown in FIGS. 6 and 7.

An alternate arrangement 10A of the trailer is illustrated in FIGS. 6, 7 and 8, wherein the guide rails 40A, similar to the guide rails 40, are positioned adjacent the inner surfaces of the respective lateral side panels 12A and 14A. The rearward end of the trailer 10A is provided with a pair of doors 56 and 58 which are hingedly connected to the respective rearward end of the side panels 12A and 14A in a conventional manner. A carriage 45A, similarly formed with respect to the carriage 45, is movable into and out of the trailer 10A through the rear doors 56 and 58.

*Operation*

Figure 3:
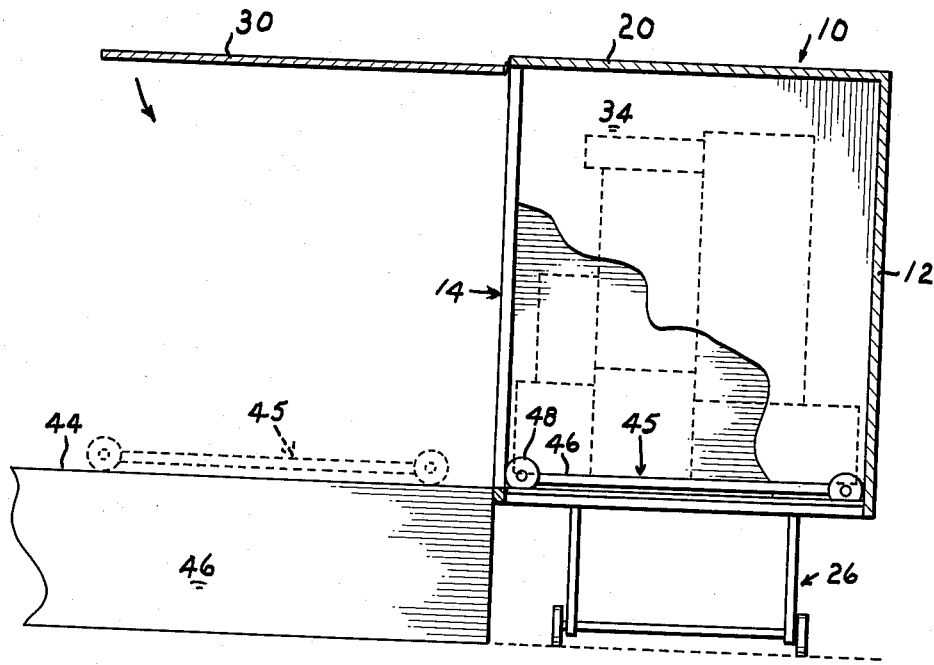
FIGURE 3 is a vertical cross-sectional view taken substantially along line 3—3 of FIG. 1 and illustrating a fragment of a loading dock.

In operation the trailer 10 is parked or positioned with the side 14 adjacent the outer edge of a conventional loading dock 46. The trailer side panels 28 and 30 are raised to the position illustrated in FIG. 3 and the carriage 45 is moved out on the surface 44 of the loading dock. The desired articles or material is placed or stacked on the uppersurface of the platform 46. The carriage is then moved into the trailer 10 through the opening formed by opening the respective panel 28 or 30. Thus it may be seen that the entire forward or rearward portion of the trailer may be loaded in a single operation. Since the carriage 45 is disposed on the comparatively unrestricted area of the dock, it permits loading of the carriage more easily since the latter may be approached from any or all of its sides. Furthermore since all the material or goods designated for a certain locaton or stop may be loaded on a single carriage 45 considerable valuable time is saved by simply reversing the loading operation to unload or remove the goods from the trailer 10 at the proper designation.

Operation of the trailer 10A is similar to the disclosure for the trailer 10 with the exception that trailer 10A is positioned with the rearward end thereof adjacent the dock 46 thus occupying a shorter or narrower area of the dock.

Obviously the invention is susceptible to some change or alteration without defeating its practicability, and I therefore do not wish to be confined to the preferred embodiment shown in the drawings and described herein, further than I am limited by the scope of the appended claim.

I claim:

A closed trailer structure, including: a substantially rectangular body having side and end panels joined at their respective upper edges by a top panel, said side panels at one side of said body being hingedly connected with said top panel for completely opening and closing said one side of said trailer, said trailer having a forward and a rearward one-fourth portion of its bottom closed defining open flooring therebetween at its second and third quarter bottom portions; channel-like guide rails extending transversely between and connected with the lower side edge portions of said body; an upstanding wheel stop within the respective end portion of each said guide rail; a pair of carriages movable into and out of the open side of said trailer, each said carriage comprising a relatively thin substantially flat rectangular platform of slightly less dimensions than the inside width dimensions of said trailer, each said carriage forming a bottom for its respective portion of the open flooring portion of said body; at least four horizontal axles horizontally connected to opposing side edge portions of said platform; and a wheel journaled by each said axle.

References Cited in the file of this patent

UNITED STATES PATENTS

| | | |
|---|---|---|
| 428,093 | Hammeken | May 20, 1890 |
| 518,831 | Bennett | Apr. 24, 1894 |
| 679,567 | Lowe | July 30, 1901 |
| 1,040,229 | McCune | Oct. 1, 1912 |
| 1,750,128 | Romine | Mar. 11, 1930 |
| 1,783,363 | Grob | Dec. 2, 1930 |
| 2,045,566 | Berg | June 30, 1936 |
| 2,498,146 | Trotter | Feb. 21, 1950 |
| 2,820,560 | Davis | Jan. 21, 1958 |